Sept. 29, 1959 H. B. SCHULTHEIS, JR 2,906,822

CODE TRANSMISSION SYSTEMS

Filed May 10, 1956

INVENTOR.
HARRY B. SCHULTHEIS, JR.
BY

ATTORNEY

United States Patent Office 2,906,822

Patented Sept. 29, 1959

2,906,822

CODE TRANSMISSION SYSTEMS

Harry B. Schultheis, Jr., Reseda, Calif., assignor to Bendix Aviation Corporation, North Hollywood, Calif., a corporation of Delaware Application May 10, 1956, Serial No. 584,057

7 Claims. (Cl. 178—53.1)

This invention relates to systems for transmitting electrically-coded information from one location to another.

Briefly, the present invention is a system for transmitting information over a single channel of communication. Information to be transmitted is formed into discrete serial information pulses by a collector mechanism which samples several different signals. These pulses are then transmitted to another location to be received and distributed for utilization by means of a distributor mechanism which distributes the different information pulses to separate circuits. The pulses have a shorter duration than the period during which a circuit path exists in the receiver through the distributor to the selected utilization circuit. That is, the contact dwell time of the distributor mechanism is of longer duration than the signal pulses. This offers the advantage that the electrical burden placed on the contacts of the distributor mechanism is reduced by not requiring the contacts of the distributor mechanism to interrupt electrical currents.

The collector and the distributor mechanisms of the system are synchronized by means of synchronizing pulses which are sent with the information pulses. Provision is also made for transmitting separate code words represented by different groups of pulses, wherein start pulses and a code-word-completion pulse are sent as a part of each group of information pulses to start the transmitting and receiving systems together and to read out each code word as soon as its transmission is completed.

An object of this invention is to provide an improved system for transmitting electrically-coded information.

Another object is to increase the contact (or segment) life of the receiving distributor.

Another object is to reduce or prevent false starting of the receiving distributor by extraneous noise, static, etc.

Another object is to individually store the pulses of each of a plurality of successively transmitted separate code words and read the word out upon completion of its transmission without waiting for reception of following code words.

Another object is to prevent the read-out of any code word unless its word completion pulse is received.

Other and incidental objects and features of the invention will appear from the following description with reference to the drawings in which.

Figure 1:
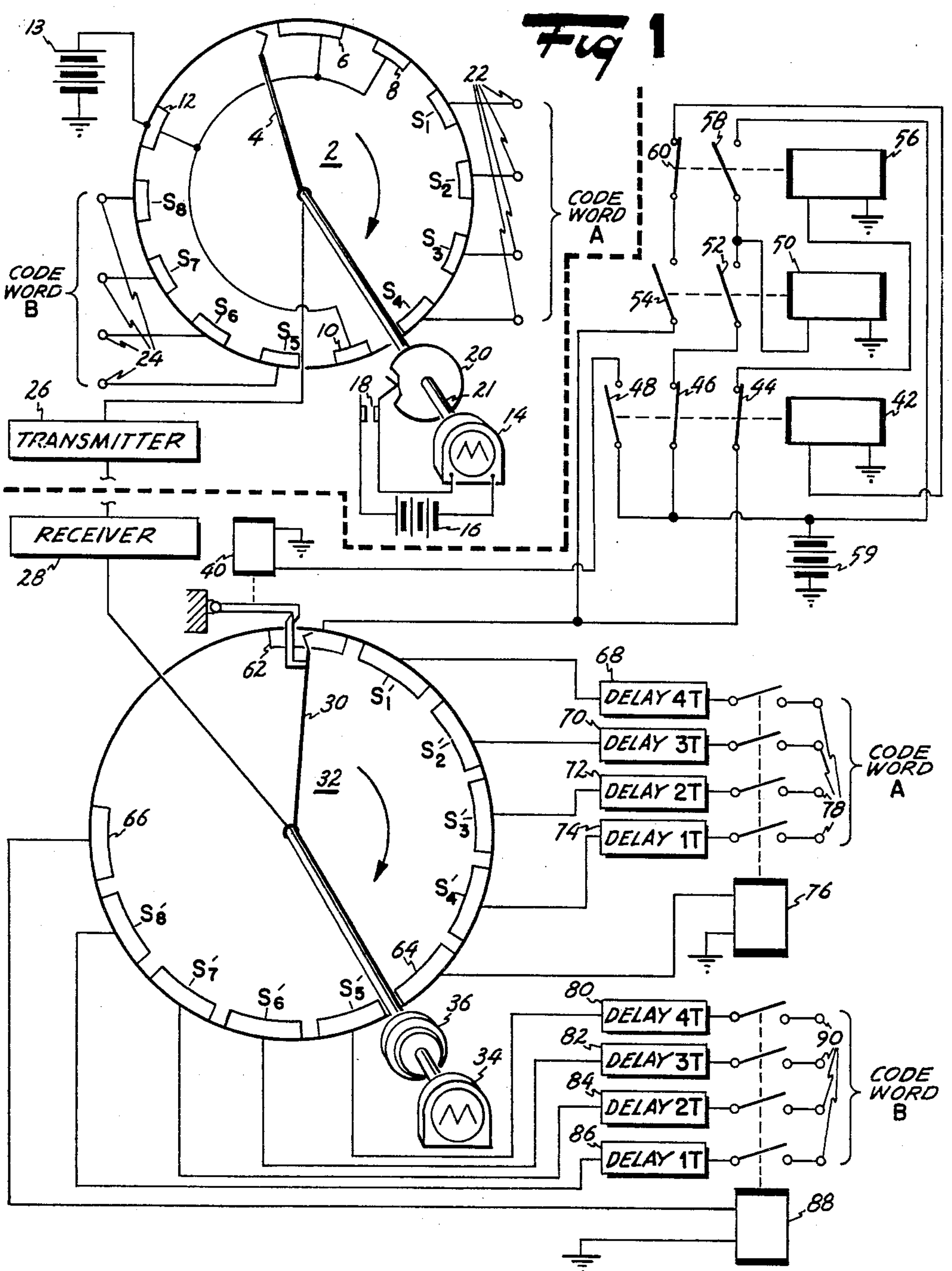
Fig. 1 is a schematic circuit and pictorial diagram of one system constructed in accordance with the invention.

The system of Fig. 1 includes a collector mechanism 2 which comprises brush 4 mounted to be rotated to contact segments 6, 8, S1–S4, 10, S5–S8, and 12 in sequence. The brush 4 is rotated by a motor 14 which is energized by a battery 16 through contacts 18. The contacts 18 may be manually operated, and are also operated by a cam 20 mounted on a shaft 21 connecting the motor 14 to the brush 4.

The segments S1–S4 of the collector mechanism 2 are connected to a group of terminals 22 and the segments S5–S8 are connected to a group of terminals 24. Code words A and B, indicative of different numerical or other information to be transmitted, are set up on the terminals 22 and 24 respectively. In the event that one of the terminals 22 or 24 receives a voltage, then a "1" digit will be indicated. If no voltage is received, a "0" digit will be indicated. Various binary and other type information-representative codes may thus be used in the system. Codes of one type which are suitable for use in this system are shown and described in an article entitled "Arithmetic Processes for Digital Computers" by J. H. Felker, beginning on page 150 of Electronics Magazine, March 1953.

The control segments 6, 8, 10, and 12 are connected to and constantly energized by a battery 13. These segments serve to form synchronizing pulses to synchronize the collector and distributor mechanisms, and to form code-completion pulses to indicate complete transmission of a code word.

The voltages set up on the segments of the collector mechanism 2 are sequentially sampled by the revolving brush 4 to form a pulse train which is applied to a transmitter 26. The transmitter 26 transmits the pulses to a receiver 28, connected to a rotatively-mounted brush 30, of a distributor mechanism 32. The brush 30 is mechanically coupled to a continuously running motor 34 through a friction clutch 36. During a quiescent period when no information is being transmitted, the brush 30 is held immovable by a latch 38. The latch 38 is raised by a solenoid 40 which is energized by a battery 59 through a switching system which includes a relay 42 having contacts 44, 46, and 48, a relay 50, having contacts 52, and 54, and a slow-operate relay 56 having contacts 58 and 60.

During the quiescent period, the brush 30 rests upon a home segment 62. Upon being released, however, the brush 30 moves to sequentially contact the segments S1′–S4′, 64, S5′–S8′, and 66. The segments S1′–S4′ are coupled through delay circuits 68, 70, 72, and 74, respectively, to individual contacts of a relay 76 having normally open cooperating contacts which are in turn connected to output terminals 78. The relay 76 is connected to be energized through the segment 64.

The segments S5′–S8′ are connected respectively to delay circuits 80, 82, 84, and 86, which are in turn adapted to be conected by individual contacts of a relay 88 to output terminals 90. The relay 88 is connected to be energized through the segment 66.

In the operation of the system of Fig. 1, two four-digit code words A and B are applied simultaneously, i.e., in parallel, to the input terminals 22 and 24, respectively. The switch 18 is then manually closed to enable the battery 16 to energize the motor 14 thereby causing the motor 14 to revolve. As the motor 14 revolves, the cam 20 moves to hold the contacts 18 closed for one revolution. Thus, upon momentary closure of the contacts 18, the motor 14 makes one revolution and stops. Remote control of the motor 14 may, of course, be utilized.

Figure 2:
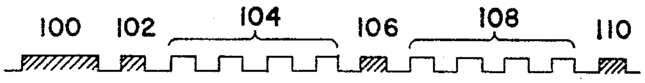
Fig. 2 shows a waveform of an electrical signal formed within the system of Fig. 1.

As the brush 4 is revolved by the motor 14, it first contacts the constantly energized segment 6, which is of greater length than the other segments in the collector mechanism 2. During the period that the brush is traversing the segment 6, a "guard" pulse 100 is formed, as shown in Fig. 2. The brush 4 next contacts the constantly energized segment 8 to form a "start" pulse 102. The next four segments S1′–S4′, are enegrized or deenergized according to the code word A set up on the terminals 22 to produce various pulse combinations in the pulse group 104. As the brush 4 passes over the constantly energized segment 10, a code-word-completion pulse 106 is formed, indicating the end of code word A. The brush 4 then traverses the segments S5–S8 to form pulse group 108 indicative of code word B. The segment 12 is next traversed by the brush 4 to form a code-word-completion pulse 110. The cam 20 will now have completed one revolution and opened the contacts 18 to stop the motor 14.

It may therefore be seen that a train of pulses, as shown by the waveform of Fig. 2, is formed during each revolution of the brush 4 in the collector mechanism 2. Four pulses are outlined in each of the pulse groups 104 and 108; however, it is to be understood that individual pulses in these pulse groups may or may not be present in the various outlined positions depending upon the value of the code word being transmitted.

Consider now the operation of the receiving distributor 32 upon receiving the pulse train shown in Fig. 2. The guard pulse 100 passes through the brush 30 to the segment 62, and through the normally-closed contacts 44 to the relay 56. The relay 56 is a slow-operate relay and thus requires a pulse over a predetermined length to be operated. The starting of the system is thus rendered immune to spurious signals having less than a predetermined time duration.

Upon energization, the relay 56 momentarily opens the contacts 60 and closes the contacts 58. The contacts 60 are opened to temporarily render the relay 42 immune from operation. Closure of the contacts 58 applies a voltage from a battery 59 to energize the relay 50. At the end of the guard pulse 100, relay 56 releases, closing the contact 60.

Energization of the relay 50 closes the contacts 52, which lock the relay 50 up, and the contacts 54, which prepare the switching circuit to receive the start pulse 102. The start pulse 102 is received upon the segment 62 to be applied through the contacts 54 and 60, to energize the relay 42. Operation of the relay 42 opens the contacts 44 to render the relay 56 immune from operation again, opens contacts 46 to de-energize the relay 50, and close the contacts 48 to energize the solenoid 40. Energization of the solenoid 40 opens the latch 38 to allow the motor 36 to revolve the brush 30. The rates of rotation of the motors 14 and 34 are substantially the same so that if the brushes 4 and 30 start revolving at the same point, they will maintain synchronism throughout the cycle. The movement of the brushes 2 and 30 will, therefore, be such that the segments S1–S4 are individually contacted by the brush 4, during the same intervals respectively as the segments S1′–S4′ are contacted by the brush 30. The code word A appearing at the terminals 22 will, therefore, be collected by the brush 4, transmitted, received, then distributed by the brush 30 to the segments S1′–S4′ to then be applied to the delay circuits 68, 70, 72, and 74. The delay circuit 68 delays signals by a period 4T, equal to four times the period required for the brush 30 to move from one to another of the segments in the distributor mechanism 32. The delay circuits 70, 72, and 74 are such as to delay signals respectively by three times this period 3T, two times this period 2T, and this period T. The code word A will, therefore, evolve from the delay circuits 68, 70, 72, and 74 in a parallel fashion at the time when the brush 30 rides onto the segment 64, at which time the word-completion-pulse 106 will be received, if the communication channel is still closed, and will energize the relay 76. If the relay 76 is energized, the code word passing from the delay circuits 68, 70, 72, and 74 will be coupled to the output terminals 78. If however, the communication channel has been interrupted during the transmission of a code word, then the pulse 106 will not be received, the relay 76 will not be energized, and the code word under transmission when the interruption occurred will not be passed to the output terminals 78 for utilization.

The operation of the system to transmit the code word B is similar to that described for transmission of the code word A. The code word B is set up on the input terminals 24, is formed into serial pulse group 108, transmitted and distributed to the segments S5′–S8′, then applied to the delay circuits 80, 82, 84, and 86. The delay circuits 80, 82, 84, and 86 are so arranged that the pulses will leave these delay circuits almost simultaneously and be applied to the contacts of the relay 88, at the time when the word completion pulse 110 should be appearing on the segment 66. If the pulse 110 does appear on the segment 66, then the relay 88 will be energized and the code word will appear on the output terminals 90 in parallel fashion.

It is to be noted that the segments of the distributor 32 are longer than the segments of the distributor 2 and thus have a longer dwell time. Therefore, assuming synchronism between the distributor 32 and the collector 2, a pulse will pass through the brush 30 during only a portion of the dwell time of the brush 30 upon one of the segments in the distributor mechanism 32, and the currents of the transmitted pulses will not be interrupted as the brush 3 departs from the segments. A certain amount of departure from synchronism between the collector 2 and the distributor 32 will be tolerable before currents will be interrupted within the distributor 32. Therefore, no arcing will take place in the distributor 32 during normal operation, thereby greatly reducing the wear on the brush 30 and the segments in the distributor 32.

It may therefore be seen that the invention provides an improved system for transmitting electrically coded information over a single channel of communication. The system is provided with a starting system having immunity to spurious signals, has improved life characteristics, and means for assuring a closed communication channel at the completion of the last code word transmitted.

Although for the purpose of explaining the invention, particular embodiments thereof have been shown and described, obvious modifications will occur to a person skilled in the art, and I do not desire to be limited to the exact details shown and described.

I claim:

1. A code transmission system comprising: collector means for sampling at least one plurality of signals constituting a parallel code word to form at least one serial code word; means for inserting a word-completion pulse after each serial code word to form therewith a composite pulse train; means for transmitting said composite pulse train to a receiver, said receiver including a distributor means for distributing pulses of each serial code word, and means for detecting the presence of said word-completion pulses after each serial code word to indicate completion of transmission of said serial code word.

2. A device according to claim 1 wherein said collector means comprises a rotatively-mounted brush adapted to be rotated over a plurality of segments to which digit-representing signals of code word may be applied.

3. A device according to claim 1 wherein said means for detecting the presence of said word-completion pulses after each code word comprises switching means for controlling utilization of said code word.

4. In a code transmission system: transmitting means including a start-stop distributor operative during each cycle of movement to transmit a train of pulses including, sequentially, a starting code followed by a message code, said starting code being different from any portion of said message code; receiving means, and means for applying said transmitted pulse train thereto, said receiving means icnluding a start-stop distributor for directing received pulses to a starting circuit in its start position and sequentially to message code circuits during movement beyond its start position, and said starting circuit comprising means selectively responsive to said starting code for starting said distributor.

5. Apparatus according to claim 4 in which said starting code includes a pulse longer than any message code pulse and said selectively responsive means includes slow operate means responsive only to pulses longer than any message code pulse.

6. Apparatus according to claim 5 in which said starting code includes a second pulse following said longer pulse, and said selectively responsive means comprises a starting element effective when energized to start said distributor; means including said slow operate means to prepare an energizing circuit to said starting element; and means responsive to a second received pulse for completing said energizing circuit.

7. Apparatus according to claim 6 in which said slow operate means is a slow operate relay, said means to prepare said energizing circuit includes a self-holding relay energized by operation of said slow operate relay, and said energizing circuit includes serially connected front contacts of said self-holding relay and back contacts of said slow operate relay.

References Cited in the file of this patent

UNITED STATES PATENTS

| | | |
|---|---|---|
| 1,280,423 | Dixon | Oct. 1, 1918 |
| 1,501,684 | Oswald | July 15, 1924 |
| 1,533,171 | Downd | Apr. 14, 1925 |
| 1,562,188 | Rainey | Nov. 17, 1925 |
| 2,017,091 | Eklund | Oct. 15, 1935 |
| 2,165,892 | Green et al. | July 11, 1939 |
| 2,284,680 | Potts | June 2, 1942 |
| 2,411,191 | Burcky | Nov. 9, 1946 |
| 2,442,301 | Locke | May 25, 1948 |